(12) United States Patent
Osmani et al.

(10) Patent No.: US 6,472,600 B1
(45) Date of Patent: Oct. 29, 2002

(54) CONNECTING CORD JUNCTION

(75) Inventors: Samir Osmani, Bissezeele; Stéphane Tognali, Villiers sur Marne; Jérôme Vandaele, Hodenc-en-Braye; Daniel Gloanec, Paris; Gilles Riboulet, Champs-sur-Marne, all of (FR)

(73) Assignee: Cables Pirelli, Saint-Maurice (FR)

( * ) Notice: Subject to any disclaimer, the term of this patent is extended or adjusted under 35 U.S.C. 154(b) by 0 days.

(21) Appl. No.: 09/402,546

(22) PCT Filed: Apr. 7, 1998

(86) PCT No.: PCT/FR98/00694
§ 371 (c)(1),
(2), (4) Date: Oct. 13, 2000

(87) PCT Pub. No.: WO98/45918
PCT Pub. Date: Oct. 15, 1998

(30) Foreign Application Priority Data

Apr. 7, 1997 (FR) .............................. 97 04198

(51) Int. Cl.⁷ ................................. H02G 1/14
(52) U.S. Cl. ..................................... 174/75 R
(58) Field of Search .................... 174/74 A, 74 R, 174/73.1, 75 R, 93, 138 F, DIG. 8

(56) References Cited

U.S. PATENT DOCUMENTS 5,467,515 A   11/1995   Luzzi
5,486,388 A * 1/1996   Portas et al. ........... 174/73.1 X
5,844,170 A * 12/1998  Chor et al. .............. 174/74 A

FOREIGN PATENT DOCUMENTS

| FR | 2 724 444 | 3/1996 |
| GB | 1292276 | * 11/1972 |
| GB | 2 099 638 | 12/1982 |
| WO | WO 94/23480 | 10/1994 |

OTHER PUBLICATIONS

Cables Pirelli: "Inauguration d'une nouvelle ligne de production "Elaspeed" á Marne–la–Vallée", RGE Revue Generale de l'Electricite, Paris, France, No. 8, pp. 62–63, (1994).

* cited by examiner

Primary Examiner—Chau N. Nguyen
(74) Attorney, Agent, or Firm—Finnegan, Henderson, Farabow, Garrett, & Dunner LLP

(57) ABSTRACT

A power cable joint device includes at least one tubular rigid support element, a cold-shrinkable, pre-expanded sleeve, and a releasable means for immobilizing the at least one support element with respect to the pre-expanded sleeve. Most of an exterior surface of the at least one support element is lubricated by a grease that does not flow under action of a pressure exerted by the pre-expanded sleeve. The pre-expanded sleeve grips the at least one support element over most of a length of the at least one support element. The pre-expanded sleeve also grips the at least one support element at internal ends of the at least one support element. The grease is based on a silicone or on a polyalkylene glycol and includes a filler, a pressure-withstanding additive, or both the filler and the pressure-withstanding additive.

24 Claims, 10 Drawing Sheets

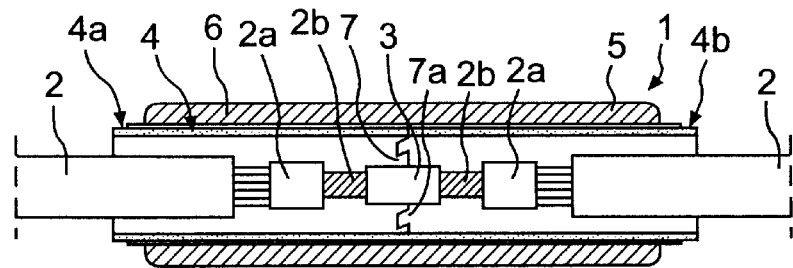
FIG. 1
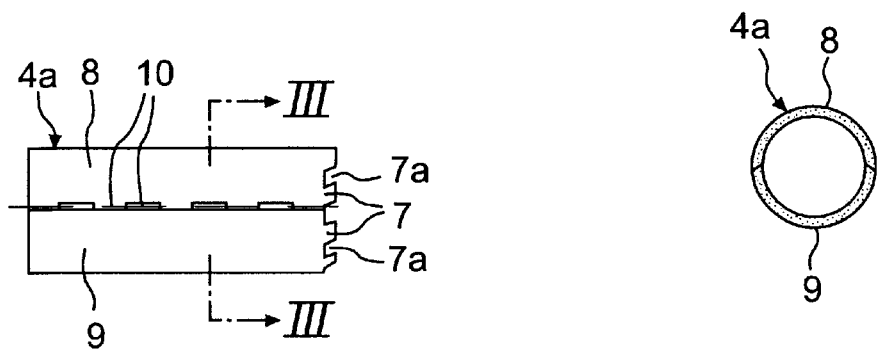
FIG. 2
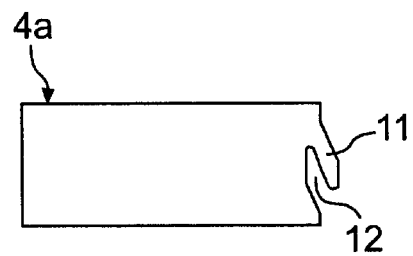
FIG. 3
FIG. 4
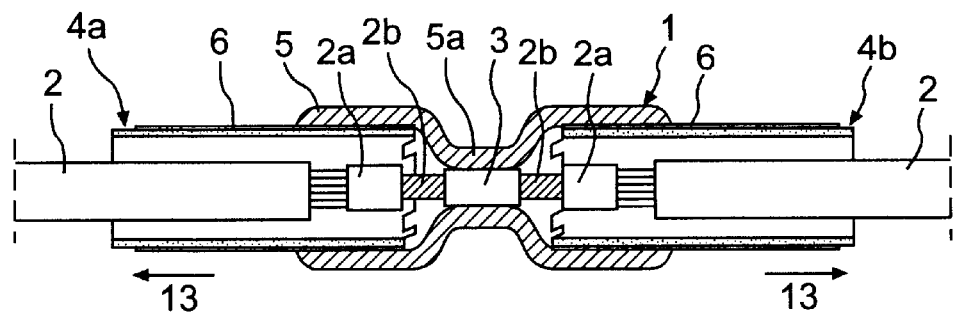
FIG. 5

CONNECTING CORD JUNCTION

CROSS-REFERENCE TO RELATED APPLICATIONS

This application is a national stage entry under 35 U.S.C. §371 from International Application No. PCT/FR98/00694, filed Apr. 7, 1998, in the European Patent Office; additionally, Applicants claim the right of priority under 35 U.S.C. §119(a)–(d) based on patent application No. 97/04198, filed Apr. 7, 1997, in the French Patent Office; the contents of both of which are relied upon and incorporated herein by reference.

BACKGROUND OF THE INVENTION

1. Field of the Invention

The subject of the present invention is a joint device for power cables or a power cable termination, comprising at least one tubular rigid support element on which is initially mounted a cold, shrinkable pre-expanded sleeve, the tubular support element being automatically expelled by acting on a releasable immobilizing means. The support thus defined is therefore called an "automatic actuated extraction" support and it is known that, in order to install a cold-shrinkable expanded protective sleeve on joint between two power cables or on the termination of a cable, it is necessary for the diameter of this sleeve to be sufficient to install it correctly on the cable or cables, the sleeve being capable of shrinking so as to grip the joint to be protected.

2. Description of the Related Art

For this purpose, a rigid tube is normally used which serves as a support for the pre-expanded sleeve and which makes it easier to install it, the sleeve subsequently having to be extracted in order to allow the sleeve to contract, which sleeve is made of a silicone-based synthetic rubber.

This extraction operation is not easy to perform because of the radial compressive stresses exerted by the sleeve.

In some constructions, a support for the pre-expanded sleeve, prescored along a helical path, is used, a pull cord allowing the material of the support to unwind along the helical cut. The support can then escape from inside the sleeve when the end of the pull cord is pulled. However, these pull-cord supports are expensive and it takes a relatively long time to extract them.

French Patent Application 2 724 444 (ALCATEL) describes a joint device for power cables, comprising cylindrical tubular rigid elements provided with a sliding film which enables them to be extracted when an axial force is exerted on them. A flexible and strong film having a low coefficient of friction is used as the sliding film, such as a silicone-based film. As the tubular element is progressively released, the pre-expanded sleeve shrinks on to the joint, the sliding film turning inside out.

U.S. Pat. No. 5,467,515 (LUZZI) discloses the use of a cold-shrinkable joint device in which a rigid tapered mandrel can be expelled by the pressure exerted on the tapered surface by the pre-expanded sleeve which grips it. In order to facilitate the expulsion, this document recommends that the external surface of the tapered rigid element be lubricated. In order to keep the tapered support temporarily in position with respect to the shrinkable sleeve, an exterior locking device is provided.

In practice, these various solutions are not entirely satisfactory. Thus, the sliding films recommended in the aforementioned document are complicated to produce and relatively fragile. In addition, it is difficult to prevent any displacement of the sleeve when removing the tubular support element or elements.

Moreover, in order to ensure that the joint is effectively protected by the shrunk sleeve, the pressure exerted by the latter on the entire joint must be high. This results in high compressive forces on the support elements of the shrinkable sleeve. The tapered shape of the support elements with a lubricated surface may be such that the taper causes the support to be expelled effectively by the thrust of the retractable sleeve. However, this tapered shape is not desirable as it also causes possibly excessive deformation of the retractable sleeve at the point of maximum diameter of the tapered support. At this point, the sleeves come back with more difficulties due to the fact that the elastic memory or the material is less when deformation was greater. It is precisely near the ends of the sleeve that tightness of the sleeve is achieved. The shrinking effect must therefore be particularly important in those areas.

SUMMARY OF THE INVENTION

What is more, the pressure exerted by the shrinkable sleeve is sometimes such that the internal surface of the latter comes, in places, in direct contact with the external surface of the support element despite the intermediate lubricant, thereby no longer allowing self-expulsion of the support element.

The subject of the invention is a device for lessening or eliminating these drawbacks and for allowing self-contained expulsion actuated by the support element of the cold-shrinkable pre-expanded sleeve which limits the deformation of the sleeve and which operates perfectly despite the very high pressure exerted by the shrinkable sleeve on its support.

The subject of the invention is also a joint which, after the support has been expelled from the shrinkable sleeve, has excellent electrical insulation properties.

Finally, the subject of the invention is a joint device whose operating characteristics remain constant, even when it is stored for several years.

The subject of the invention is also a joint device in which the pressure exerted by the shrunk sleeve after the joint device has been fitted is greater than 1 bar ($10^5$ Pa) preferably greater than 4 bar ($4 \times 10^5$ Pa) and may go up to 15 bar ($15.10^5$ Pa) so as to ensure excellent protection and to be certain of removing any air pocket which could be formed while the sleeve is shrinking.

The power cable joint device according to the invention comprises at least one tubular rigid support element, lubricated over most of its exterior surface, a cold-shrinkable pre-expanded sleeve, gripping the said support element over most of its length and on its internal end, and a releasable immobilizing means which keeps the said support element immobilized with respect to the pre-expanded sleeve. According to the invention, the said support element is covered over most of its exterior surface with a grease which does not flow under the action of the pressure exerted by the shrinkable sleeve, the said grease being based on a silicone or on a polyalkylene glycol advantageously additioned with a filler comprising for example talc in proportions from 15 to 35% by weight and containing preferably at least one pressure-withstanding additive such as boron nitride in proportions from 2 to 10% by weight.

The grease used is chosen so as to have a pressure-withstanding capability sufficient to withstand the high forces exerted by the shrinkable sleeve during the period of storage of the device, i.e. at least six months and up to about three years. The grease must therefore not flow appreciably under the high pressure exerted by the sleeve. The grease used must furthermore form a continuous lubricating film over the entire surface of the support element despite the pressure exerted by the sleeve, which pressure may be about 5 to 6 bar ($5\times10^5$ to $6\times10^5$ Pa) and as much as 15 bar ($15\times10^5$ Pa).

In order to achieve these a priori contradictory technical effects, the grease used is a paste having a viscosity of between 100 and 400,000 centistokes, based on a silicone such as polydimethylsiloxane or on a polyalkylene glycol, such as polyethylene glycol, preferably reinforced with a filler consisting of, for example talc eventually additioned with silica in proportions ranging from 15 to 45% by weight and which may further comprise a high-pressure-withstanding additive consisting for example of boron nitride in proportions ranging from 2 to 10% by weight.

The choice of the grease base is linked to the nature of the material used for the expanded sleeve. With a silicone sleeve, it is preferable to use a polyalkylenoglycol based grease. If the sleeve is made of another elastomeric material, such as an ethylene-propylenediene terpolymer, it is on the contrary advisable to use a silicone based grease. The viscosity of the grease is chosen to be more important when the pressure exerted by the sleeve is more important.

The filler used, for example talc, permits to increase the consistency of the grease so that a film of lubricant remains between the sleeve and the support element. With too much filler, the grease becomes sticky. When only said filler is used, its amount may range between 15 and 35% by weight.

The pressure-withstanding additive permits to achieve a suitable sliding effect. If any said additive is used, an amount greater than 15% must be used and preferably between approximately 20 and 40% by weight.

Finally, the grease composition which is used is as follows:

Silicone or polyalkyleneglycol base (Viscosity between 100 and 400,000 centistokes) . . . 60–80% by weight
Pyrogenated silica (thickener) . . . 0–10% by weight
Talc . . . 15–35% by weight
Boron nitride (high pressure withstanding additive) 0–10% by weight Such a grease has excellent hydrophobicity and good electrical insulation properties. It also has an excellent temperature-withstanding capability and high chemical inertness.

The releasable immobilizing means is preferably such that it creates a localized friction zone between the support element and the shrinkable sleeve and, when it is released, causes localized shrinkage of the sleeve near the internal end of the support element, which is then thrust axially outwards. The grease defined above ensures sufficient lubrication for this thrust to cause effective self-contained expulsion of the support element, whatever the shape of the support element.

The support element generally comprises, for a joint between two cables, two tubular rigid half-supports arranged inside the pre-expanded sleeve with their internal ends facing each other.

The dimensions of the two half-supports may be the same or different.

The half-supports may be cylindrical, with a circular or elliptical cross-section. They may be tapered, at least partly, with a circular or elliptical cross-section, the taper being oriented in such a way that the diameter of the half-support is smaller towards the interior of the joint.

The releasable immobilizing means preferably comprises a means for temporarily fastening the two half-supports together, which may be produced in various ways.

In a first embodiment, the means for temporarily fastening the two half-supports together comprises an internal strap, the ends of which emerge on the outside via holes provided in the half-supports, In a second embodiment, the means for temporarily fastening the two half-supports together comprises at least one tab which projects from the internal edge of a half-support, is inclined with respect to the axis of the half-support and engages in a recess of corresponding shape cut into the internal edge of the other half-support, so that a relative rotation of the half-supports with respect to each other causes them to separate.

In another embodiment, the means for temporarily fastening the two half-supports together is formed by a frangible fastening of the internal edges of the two half-supports.

It is also possible to provide, on at least one of the half-supports, near its internal edge, a portion which can be torn by pulling a tie extending as far as the outside, the exterior surface of this tearable portion being devoid of grease. This non-lubricated portion is sufficient to immobilize the relevant half-support despite the thrust exerted by the shrinkable sleeve.

The same effect is obtained when each half-support comprises an annular friction element in contact with the pre-expanded sleeve, it being possible for the said element to be expelled by pulling on a tie extending as far as the outside.

It is important for the quality of protection of the joint that the shrunk sleeve be perfectly centred with respect to the joint. However, it is realized that any displacement of the half-support or supports during it or their expulsion runs the risk of modifying any centring performed before shrinkage. It is therefore useful to provide, in addition, means for precisely centring the sleeve with respect to the joint.

For this purpose, the joint device according to the invention comprises an additional means for immobilizing one of the half-supports with respect to the pre-expanded sleeve, it being possible for the effect of this additional sleeve to be obviated after expelling the other half-support and checking that the joint is centred.

In one embodiment, at least one longitudinal external strap connecting the external edges of the half-supports together and a removable clamping means fixing the said external straps to the pre-expanded sleeve and defining portions of unequal length on the straps are provided.

In another embodiment, at least one longitudinal external strap connects the external edges of the half-supports together and at least one return strap is fixed on one side to the external edge of a half-support and on the other side to the exterior surface of the pre-expanded sleeve, near the centre of the joint device.

In another embodiment, at least one longitudinal external strap connecting the external edges of the half-supports together and a removable localized-friction means placed on each half-support and in direct contact with the shrinkable sleeve are provided.

In all cases, the support element preferably includes means for separating it from the power cable after it has been expelled from the shrinkable sleeve.

BRIEF DESCRIPTION OF THE DRAWINGS

For example, the support element is prescored along a helical incision or else cut into two parts along a generatrix.

The support element may also have, along at least one generatrix, one or more frangible rupture zones.

Figure 6:
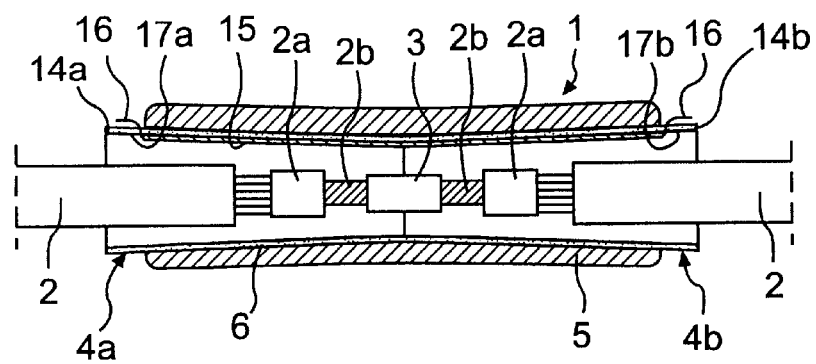
Figure 7:
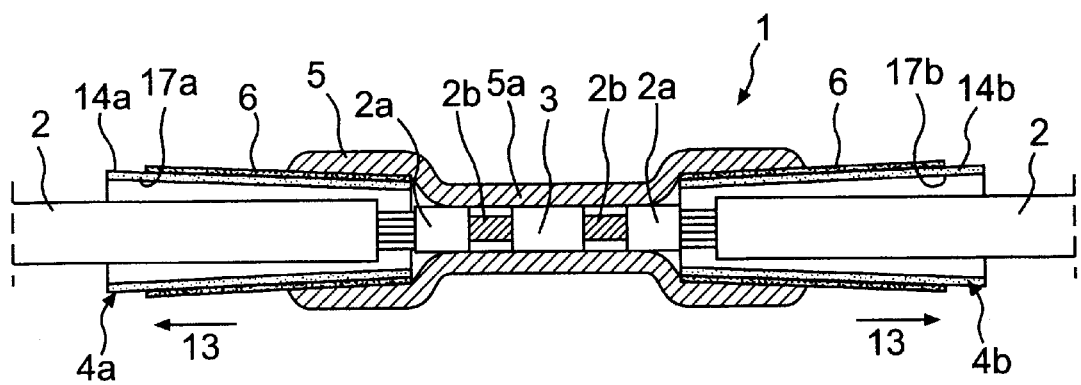
Figure 8:
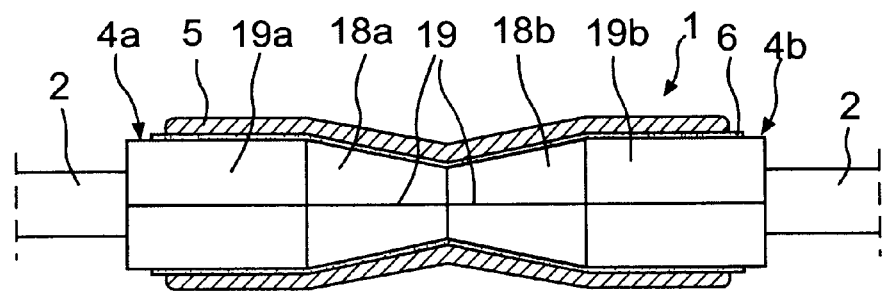
Figure 9:
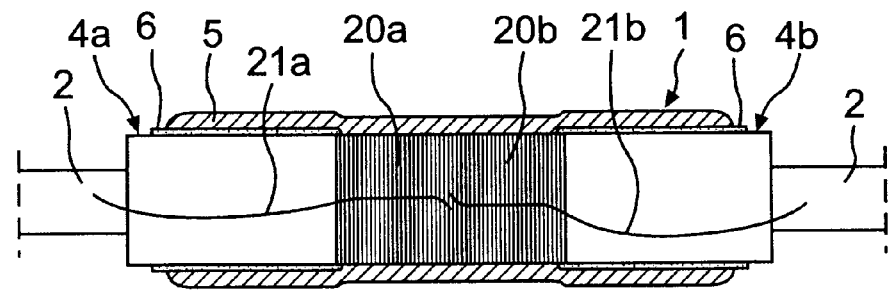
Figure 10:
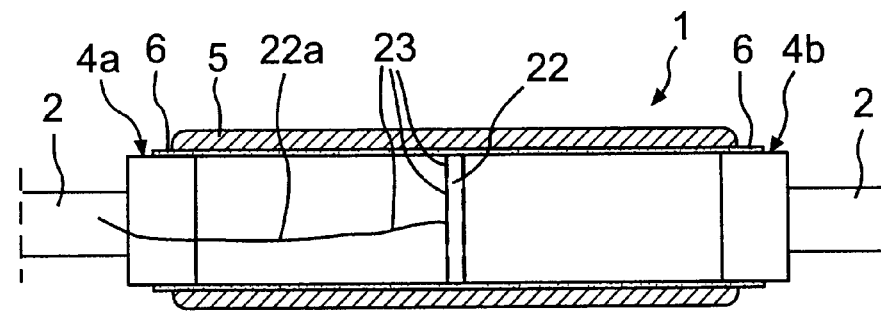
Figure 11:
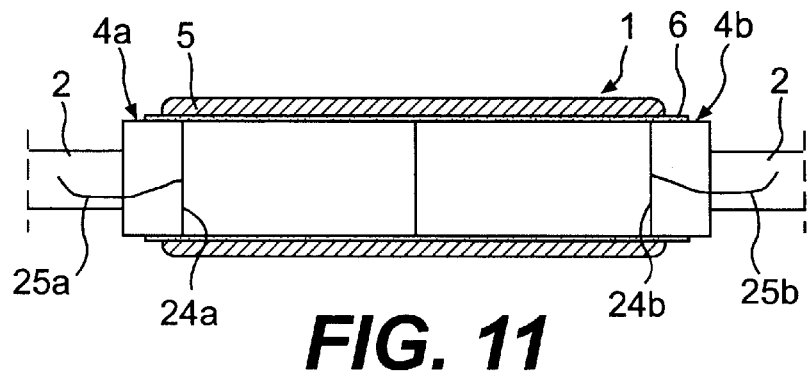
Figure 12:
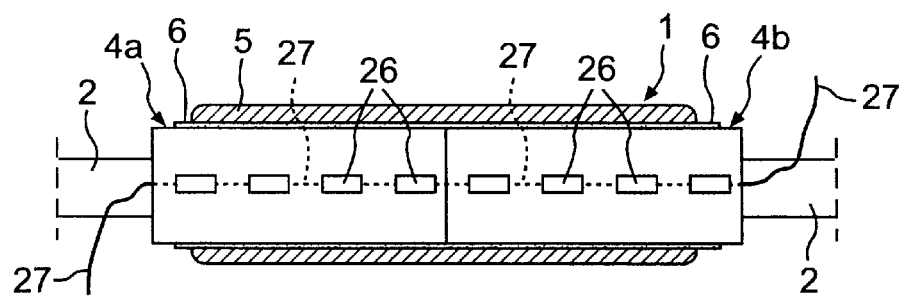
Figure 13:
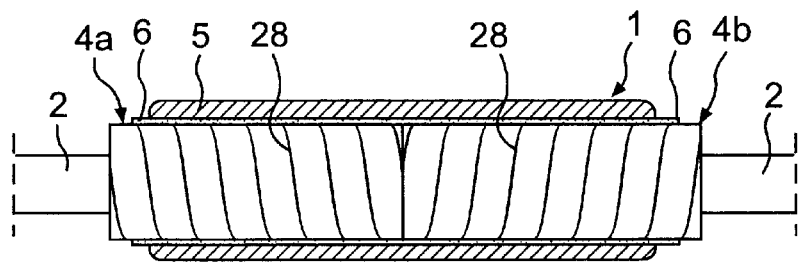
Figure 14:
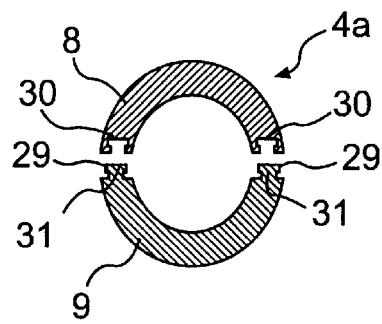
Figure 15:
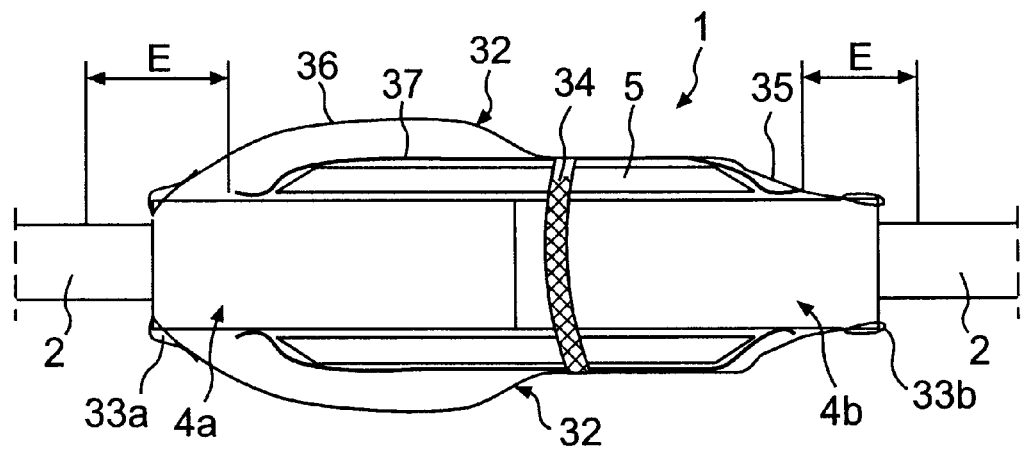
Figure 16:
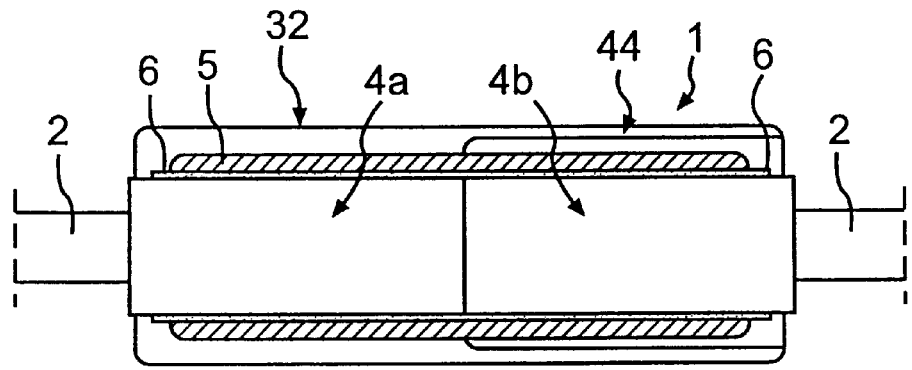
Figure 17:
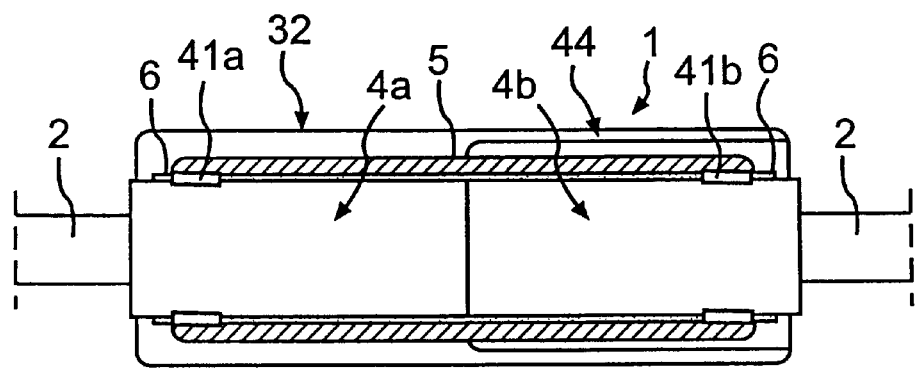
Figure 18:
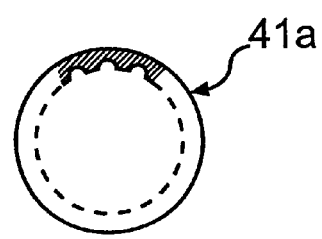
Figure 19:
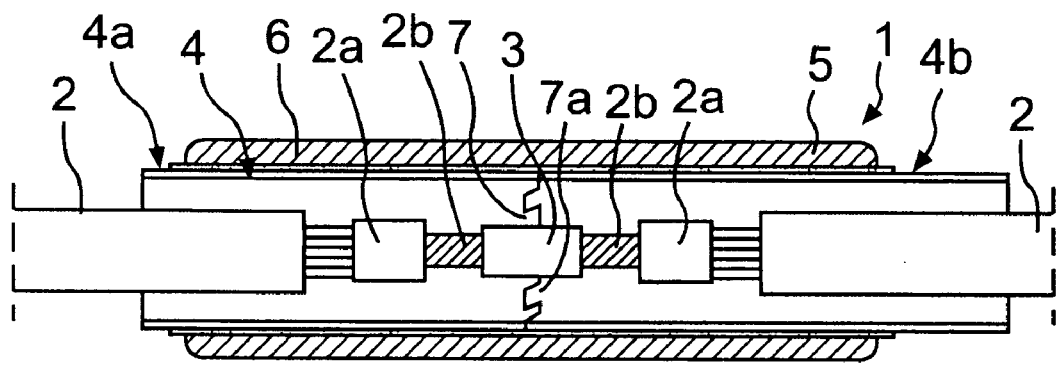
Figure 20:
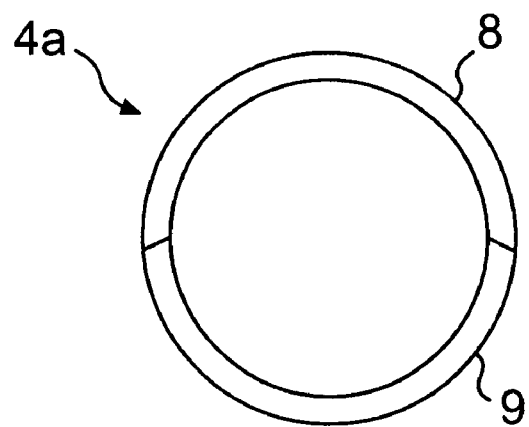

The invention will be clearly understood by studying a few particular embodiments taken by way of entirely non-limiting, examples and illustrated by the appended figures in which:

FIG. 1 shows diagrammatically, and in partial cross-section, an embodiment of a joint device according to the invention using two cylindrical half-supports;

FIG. 2 is an exterior view, from the side. of a half-support used in the device illustrated in FIG. 1;

FIG. 3 is a cross-sectional view on III—III of the half-support illustrated in FIG. 2;

FIG. 4 is an exterior view, from the side, of another embodiment of a half-support which can be used in a joint device according to the invention;

FIG. 5 is a view, in partial cross-section, of the joint device illustrated in FIG. 1, showing the state of the device during shrinkage of the pre-expanded sleeve;

FIG. 6 is a view, in partial cross-section, of another embodiment of a joint device according to the invention, this time using two tapered half-supports;

FIG. 7 is a view, in partial cross-section, of the joint device illustrated in FIG. 6, showing the state of the device during shrinkage of the pre-expanded sleeve;

FIG. 8 is a view, in partial cross-section, of another embodiment of the joint device according to the present invention, this time using two partially frustoconical and partially cylindrical half-supports;

FIG. 9 illustrates one embodiment of the releasable immobilizing means;

FIG. 10 illustrates another embodiment of the releasable immobilizing means;

FIG. 11 illustrates yet another embodiment of the releasable immobilizing means;

FIGS. 12 and 13 illustrate two embodiments of supports allowing subsequent expulsion of the said supports after the pre-expanded sleeve has shrunk;

FIG. 14 is a cross-sectional view of a support according to another embodiment;

FIG. 15 is a view, in partial cross-section, showing a joint device according to the invention, which includes centring means;

FIGS. 15a to 15h illustrate the use of the device shown in FIG. 15;

FIG. 16 is a view, in partial cross-section, of a joint device which includes centring means differing from those of the device illustrated in FIG. 15;

FIG. 17 is a view, in partial cross-section, of a joint device according to the invention, which also includes centring means such as the devices illustrate in FIGS. 15 and 16 but according to another embodiment;

FIG. 18 is a cross-sectional view of one of the locking rings which may be seen in FIG. 17;

FIG. 19 shows diagrammatically, and in partial cross-section, an embodiment of a joint device according to the invention using two cylindrical half-supports similar to FIG. 1, but with one half-support longer than the other; and FIG. 20 is a cross-sectional view of a half-support similar to the cross-sectional view of FIG. 3, but with an elliptical cross-section.

DETAILED DESCRIPTION OF THE PREFERRED EMBODIMENTS

As illustrated in FIGS. 1 to 3, the power cable joint device according to the invention, labelled in its entirety by 1, is intended to interact with two power cables 2, the ends 2a of which have been stripped, the stripped parts 2b having been joined together by a connector 3. The purpose of the joint device 1 according to the invention is to protect the joint and the connector 3.

For this purpose, the device 1, which has been slipped over the end of one of the power cables 2 before making the joint, is subsequently put into position centred with respect to the connector 3. as illustrated in FIG. 1.

The device of the invention comprises a rigid tubular support element 4 consisting, in the example illustrated in FIG. 1, of two half-supports 4a, 4b having identical dimensions and the general shape of a cylinder with a circular cross-section.

A cold-shrinkable pre-expanded tubular sleeve 5 grips the tubular support element 4 over most of its length. The sleeve 5 may be made of a silicone-based elastomeric material. It may also be made of another elastomeric material or any other cold shrinkable material having the mechanical and electrical properties suitable for subsequently protecting the joint and the ends of the two power cables 2. It will be noted that, in order to provide good subsequent protection of the joint and of the ends of the power cables 2, it is important for the pressure exerted on the connector 3 after the sleeve 5 has shrunk to be high. The device according to the invention makes it possible, in particular, to use shrinkable sleeves 5 which exert a pressure greater than 1 bar ($10^5$ Pa) or even greater than about 4 bar ($4 \times 10^5$ Pa) and up to 15 bar ($15 \times 10^5$ Pa) on the support 4.

The support element 4 is covered on that part of its exterior surface which is gripped by the sleeve 5 with a film of non-flowing, grease having the composition and properties which were indicated previously. The grease is preferably silicone based when the sleeve is made of another elastomeric material and glycol based when the sleeve is made of silicone. This film of grease, has been depicted in an exaggerated manner, as regards its thickness, in the form of a solid line labelled 6 in FIG. 1. The thickness of the film of grease depends upon its viscosity and the pressure exerted by the sleeve 5.

The internal edges of the two half-supports 4a, 4b, i.e. the edges which are gripped by the sleeve 5, comprise a plurality of projecting tabs 7 which are all inclined with respect to the axis of the tubular support 4 and engage in recesses 7a of corresponding shape cut into the internal edge of the other half-support, as may also be seen in FIG. 2.

By virtue of this structure, the two half-supports 4a, 4b are kept interlocked by their respective internal edges so that the assembly formed by the two half-supports 4a, 4b gripped by the pre-expanded sleeve 5 constitutes a one-piece assembly which can be easily stored before use. In addition, at the time of use, all that is then required is to rotate one half-support, for example 4a, relative to the other half-support, for example 4b, so as, by virtue of the inclination of the tabs 7 and of the recesses 7a, to separate the two half-supports 4a, 4b from each other along the axis of the device.

The two half-supports 4a, 4b are identical and only one of them (4a) illustrated in FIG. 2 will be described here. The half-support 4a is made by assembling two semi-cylindrical shells 8 and 9, each representing half of the half-support 4a. The two shells 8 and 9 are assembled along a generatrix parallel to the axis by means of a plurality of crenels 10 made respectively and alternately along the contacting generatrices of shells 8 and 9, as may be seen in FIG. 2. The crenels 10 are furthermore made in such a way that no projection appears on the exterior surface of the half-support 4a, as may be seen in FIG. 3, so as not in any way to impede the expulsion of the half-supports 4a, 4b by the lubricated sliding of the exterior surface of the half-supports 4a, 4b with respect to the interior surface of the sleeve 5 during shrinkage of the latter.

FIG. 4 shows a structural variant of a half-support 4a in which two diametrically opposed tabs 11 are provided on the internal edge of each half-support 4a, which also has a recess 12 of complementary shape intended to accommodate the corresponding tab 11 of the half-support 4b facing it. The tabs 11 are longer than the tabs 7 of the embodiment illustrated in FIG. 2. However, their effect is similar and they make it possible, upon relative rotation of the two half-supports 4a, 4b, to separate the latter.

FIG. 5 shows the use of the device of the invention after performing a relative rotation of the two half-supports 4a and 4b with respect to each other causing, as just mentioned, separation near the central part of the joint device, i.e. at the site of the connector 3. As soon as slight separation has been obtained, the pre-expanded sleeve 5 shrinks, gripping the connector 3 in its central part 5a. This localized shrinkage of the sleeve 5 results in an axial thrust by the sleeve 5 on the respective internal edges of the two half-supports 4a, 4b which are therefore automatically expelled by moving in the direction of the arrows 13 seen in FIG. 5. This effect is obtained both by the thrust exerted by the sleeve 5 and because of the existence of the film of grease whose properties are such that it forms effectively a continuous lubricating film over the entire surface of the half-supports 4a and 4b despite the high pressure exerted by the sleeve 5. This autonomous expulsion is thus achieved despite the cylindrical shape of the half-supports 4a, 4b.

The embodiment illustrated in FIG. 6 differs from the embodiment illustrated in the previous figures by the fact that the two half-supports 4a, 4b have a slight taper towards the interior of the joint, their diameter being slightly smaller at the point where their internal edges come into contact with each other compared to their external edges where the diameter is greater. Each of the half-supports 4a, 4b has, near its external edge, a portion 14a, 14b which extends beyond the corresponding external edge of the sleeve 5. The two half-supports 4a, 4b are held against each other in the device 1 by means of a longitudinal internal strap 15 oriented along the axis of the device 1, the ends 16 of the strap emerging on the outside of the half-supports 4a, 4b via holes 17a, 17b. The ends of the strap 15 are profiled in the form of tongues allowing them to be easily seized during use of the device.

As in the embodiment illustrated in FIGS. 1 to 5, the entire joint device 1, consisting of the two half-supports 4a, 4b which are held interlocked, one in contact with the other, by the strap 15 and are surmounted by the pre-expanded sleeve 5 which grips them, may be slipped over one of the power cables 2 before fitting the joint coupling or connector 3. The smaller diameter of the two half-supports 4a, 4b is sufficient for the entire device to be able to be slid easily on the cable 2 and the joint coupling 3, even with the slight additional thickness formed by the internal strap 15. During use, the entire device 1 is moved into position, centred with respect to the joint coupling 3, and then the user releases the strap 15 by cutting off one of the end tongues, thereby releasing the strap 15 of the support element formed by the half-supports 4a and 4b. Since the two half-supports have been released from each other, they can then disengage and move apart automatically, one with respect to the other, in the direction of the arrows 13 seen in FIG. 7 due to the action of the shrinkage pressure of the sleeve 5 which is exerted on the half-supports 4a, 4b, the slight taper of which facilitates the expulsion in opposite directions and the extraction.

Again, this expulsion of the half-supports 4a, 4b is obtained by the effect of the thrust exerted by the sleeve 5 and because of the existence of the continuous lubricating film of grease covering the exterior surface of the half-supports 4a, 4b.

As previously, the two half-supports 4a, 4b are advantageously made in the form of two shells, clipped together, which make it possible to open each half-support longitudinally and to remove it from the power cable 2. The shells are separated by disconnecting a mechanical fastener, or else by material removal or rupture. As previously, it is also conceivable to leave the half-supports in place on the power cable or to take them back over the shrunk sleeve 5 on top of the joint coupling 3 where they can then provide additional mechanical protection.

According to the embodiment illustrated in FIG. 8, in which the identical components have the same labels, the sole difference compared to the devices illustrated and described previously is the shape of the two half-supports 4a. 4b which, in this case, have a slightly tapered part 18a, 18b near each of their internal edges and a cylindrical part 19a, 19b near each of their external edges. In a similar way to the embodiment illustrated in FIG. 2, each half-support 4a, 4b furthermore consists of two shells joined together along two diametrically opposed generatrices.

Not illustrated in FIG. 8, for the sake of simplifying matters, are the means allowing the two half-supports 4a, 4b to be held against each other before the device is used. The means consisting of the longitudinal strap 15 of the embodiment illustrated in FIGS. 6 and 7 could be used, or any other means also described here.

Although up until now the use of two half-supports having the same dimensions has been illustrated, it will be understood that it is conceivable, depending on the applications, to use one half-support which is longer than the other.

Moreover, it is also conceivable to apply the present invention to the protection of a cable termination, in which case only one half-support will be used, means being provided for immobilizing it with respect to the shrinkable sleeve.

Although the cross-section of the half-supports illustrated in the previous figures was in all cases circular, it will be understood that it is also possible, depending on the applications, to use other cross-sections, in particular an elliptical cross-section.

FIGS. 9, 10 and 11 illustrate various embodiments of the means for temporarily fastening the two half-supports together. It will be understood that the means described in these embodiments can be used whatever the shape of the half-supports. For the sake of simplifying matters, the half-supports 4a, 4b illustrated in FIGS. 9 to 11 are of the same size and are cylindrical.

In the embodiment illustrated in FIG. 9, each half-support 4a, 4b comprises, near its internal edge, a portion 20a, 20b which can be torn by pulling on a tie 21a, 21b which extends from the tearable portions 20a, 20b as far as the outside of the corresponding half-support 4a, 4b. Each tearable portion 20a, 20b is for example constituted by an helically wound strip, the internal end of which directed toward the center of the junction extends inside of the corresponding half-support 4a, 4b as a pulling tie 21a, 21b. In addition, the exterior surface of the tearable portions 20a, 20b is, at least over part of it, free of a lubricating film. In this way, the shrinkable sleeve 5 comes into intimate contact with the exterior surface of the grease-free tearable portions 20a, 20b, thereby perfectly immobilizing the two half-supports 4a, 4b.

When it is desired to use the device, the user pulls on the two ties 21a, 21b and thus unwounds the strips constituting the portions 20a, 20b. Removing the portions 20a, 20b causes the sleeve 5 to shrink, as previously described, on to the central region of the joint coupling 3 and can, as previously, expel the half-supports 4a, 4b, only the lubricated surfaces of which remain.

Although in the embodiment illustrated in FIG. 9 the grease-free tearable portion was provided on both half-supports 4a, 4b, it would also be possible to provide such a grease-free tearable portion only on one of the two half-supports 4a, 4b.

In the embodiment illustrated in FIG. 10, in which the identical components have the same labels, the two half-supports 4a, 4b are integral with each other at their internal edges by a continuous ring of material 22 frangibly linked to each of the half-supports 4a, 4b, for example by means of a plurality of slits 23 or of spot welds. The ring 22 is linked to the outside by a tie 22a so as to allow the ring 22 to be torn and extracted. The removal of this ring 22 then allows, as previously, the sleeve 5 to start to shrink at this point, thereby creating an axial thrust on the two half-supports 4a, 4b which are then automatically expelled due to the existence of the lubricating film and the thrust of the sleeve 5.

The ring 22 could be replaced simply by fastening together the respective internal edges of the two half-supports 4a, 4b by means of spot welds or of a similar frangible zone, so that a relative rotation of the two half-supports 4a, 4b or a tensile force thereon, brings about both rupture of the frangible zone of the two half-supports 4a, 4b and a slight relative separation thereof, causing them, as previously, to be automatically expelled.

In the embodiment illustrated in FIG. 11, in which the identical pieces have the same labels, each half-support 4a, 4b includes a cord 24a, 24b placed in a groove around the circumference of the corresponding half-support 4a, 4b. This cord constitutes an annular friction element in frictional contact with the interior surface of the sleeve 5, thus preventing any sliding movement of the two half-supports 4a, 4b which, in this embodiment, are not fastened to each other.

During use, it then suffices to remove the cords 24a, 24b by pulling on the expulsion ties 25a, 25b, one end of which remains on the outside, in order to cause the two half-supports 4a, 4b to be automatically expelled due to the action of the thrust exerted on their respective internal edges by the pre-expanded sleeve 5 and because of the existence of the continuous lubricating film present on the exterior surface of the two half-supports 4a, 4b.

FIGS. 12, 13 and 14 illustrate three embodiments allowing separation of the two half-supports 4a, 4b after they are expelled by sliding and moving longitudinally along the joint.

In the embodiment illustrated in FIG. 12, each half-support 4a, 4b has, along two diametrically opposed generatrices, a plurality of slits 26 which thus define two frangible lines. A tie 27 embedded within the wall thickness of the half-support along each of those lines can be used to make it easier to separate each half-support 4a, 4b into two parts by pulling said tie 27.

In a possible modification, the separation is obtained only by the ties 27 without the half-supports 4a, 4b having the slits 26. The frangible lines may also be formed simply weakening of the material, for example a locally reduced thickness replacing the slits 26.

In the embodiment illustrated in FIG. 13, each half-support 4a, 4b is prescored with a helical incision 28. After expelling each half-support 4a, 4b, all that is then required is to pull on one end of each half-support 4a, 4b in order to unwind the helix and thus remove the half-supports 4a, 4b from the power cables 2.

In the embodiment illustrated in FIG. 14, in which a half-support 4a has been shown in cross-section, the half-support comprises two shells 8, 9 similar to those of the embodiment illustrated in FIG. 2, these being joined together, however, by two longitudinal projecting slide rails 29 along the shell 9 and capable of engaging in corresponding longitudinal recesses 30 along the facing longitudinal edges of the shell 8. The shells 8 and 9 are therefore separated by sliding or by material rupture, the slide rail 29 being connected to the body of the shell 9 by a thin longitudinal wall 31.

FIG. 15 illustrates an embodiment which also includes means allowing the device of the invention to be accurately centred with respect to the joint coupling. Of course, these means could be applied to the various embodiments just described and, in particular, whatever the structure of the half-supports.

The joint device illustrated in FIG. 15 includes two longitudinal straps 32, the ends of which are fixed to the half-supports 4a, 4b near their respective external edges by a fixing means 33a, 33b. A clamping strap 34 goes around the entire device and also grips the two longitudinal straps 32, thereby defining, on each of the latter, two portions 35 and 36. The portion 35 extends from a fixing point 33b to a fixing point defined by the clamping of the clamping strap 34. Between these two fixing points, the portion 35 is taut.

The other portion 36, fixed between the fixing point 33a near the external edge of the half-support 4a and the fixing point formed by the clamping of the clamping strap 34, is longer and, moreover, between these two fixing points, it is not taut. FIG. 15 also shows diagrammatically the shrinkable sleeve 5 together with an external protective cover 37. Although this is not depicted in FIG. 15 for the sake of simplifying matters, it will be understood that the exterior surface of the two half-supports 4a, 4b is also coated with a lubricating film consisting of the abovementioned grease.

In the same way, suitable means, such as those described in the above embodiments, may be used to immobilize the means for locking the half-supports 4a, 4b.

The manner in which the embodiment illustrated in FIG. 15 is used will now be described with the aid of FIGS. 15a to 15h.

After the two power cables to be connected have been cut, the joint device 1 according to the invention is slipped over one of them. The cables are prepared by stripping, to certain dimensions, the semiconducting insulating protective sleeves and the core of the power cable. The cable cores are connected by the connector 3. The joint device 1 of the invention is then centred with respect to the prepared region of the cables, the operator taking care to ensure that the dimensions E between the half-supports 4a, 4b and a reference mark on the cable sheath are identical on each side, which ensures precise centring.

Figure 15A:
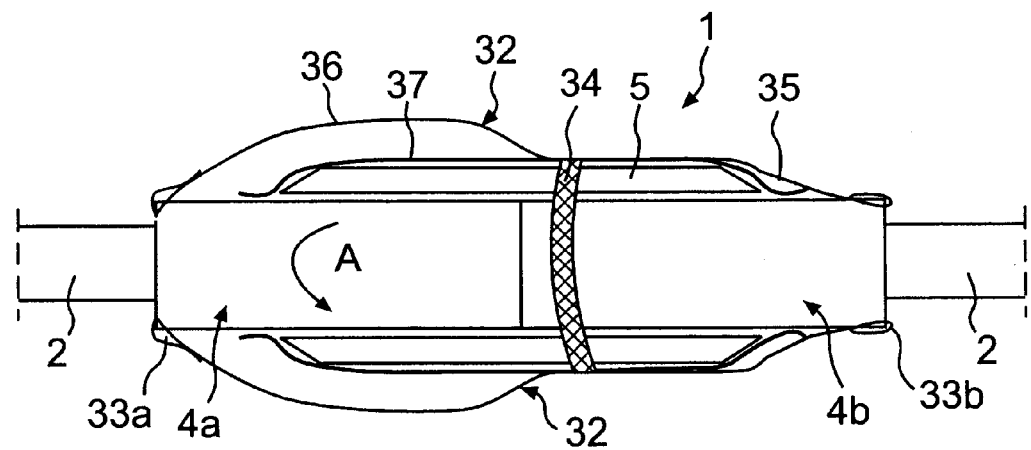
Figure 15B:
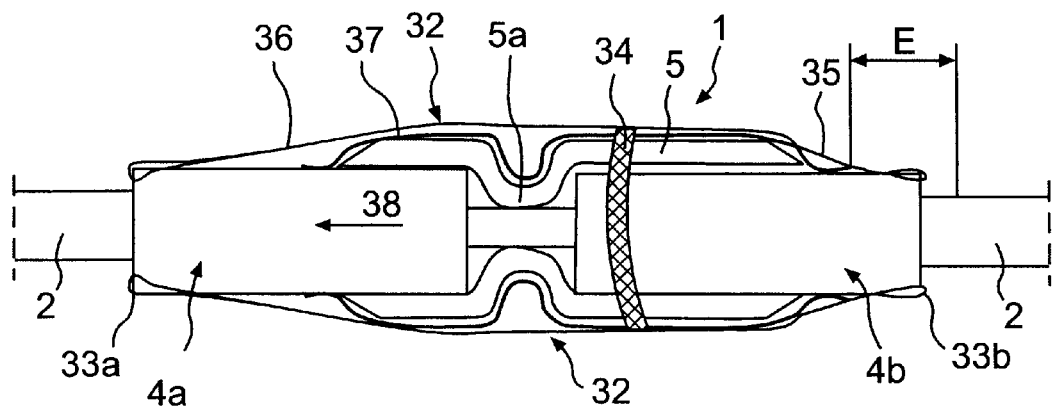

As indicated in FIG. 15a, the operator then creates a space between the two half-supports 4a, 4b, for example by a relative rotation of the said half-supports, as indicated by the arrow A in FIG. 15a. This results, as may be seen in FIG. 15b, in the sleeve 5 shrinking into the space thus created and in a thrust force on the half-support 4a which then moves along the cable 2 in the direction of the arrow 38 until the portions 36 of the longitudinal straps 32 are tied and folded in the position illustrated in FIG. 15b. It will be noted that the half-support 4b has not moved as it is held in position by the portion 35 of the longitudinal straps 32 fixed by the clamping strap 34.

The operator can then check that the dimension E on the opposite side from the moving half-support 4a has not changed from the start of the operations. If it has changed, he can still correct the centring of the device.

Figure 15C:
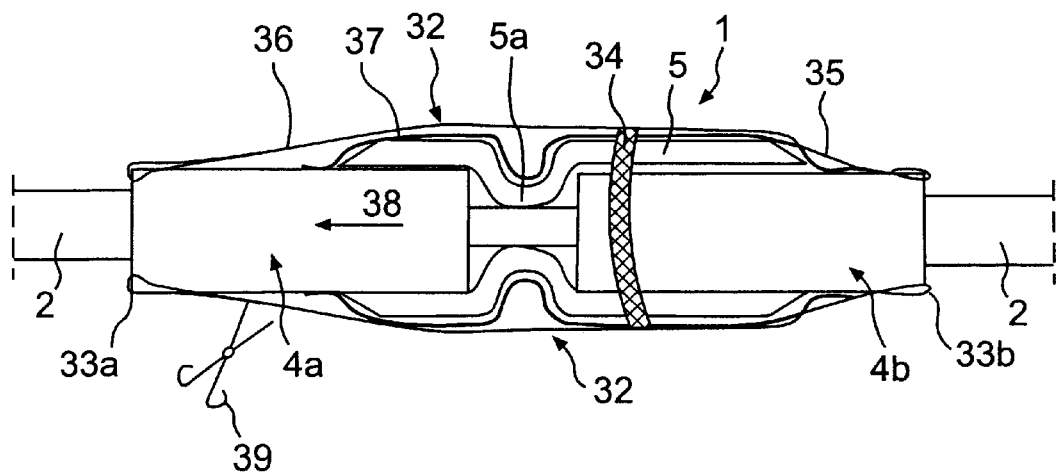
Figure 15D:
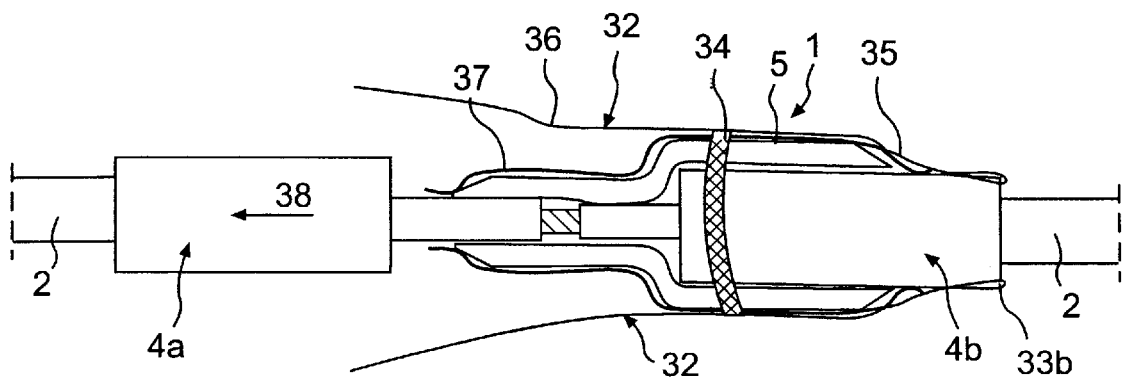

Next, the operator releases the portions 36 of the longitudinal straps 32, for example by cutting them by means of scissors, depicted symbolically at 39 in FIG. 15c. The half-support 4a, being freed, is completely expelled. It can then be released from the cable 2 by means described above, but not illustrated in FIG. 15d.

Figure 15E:
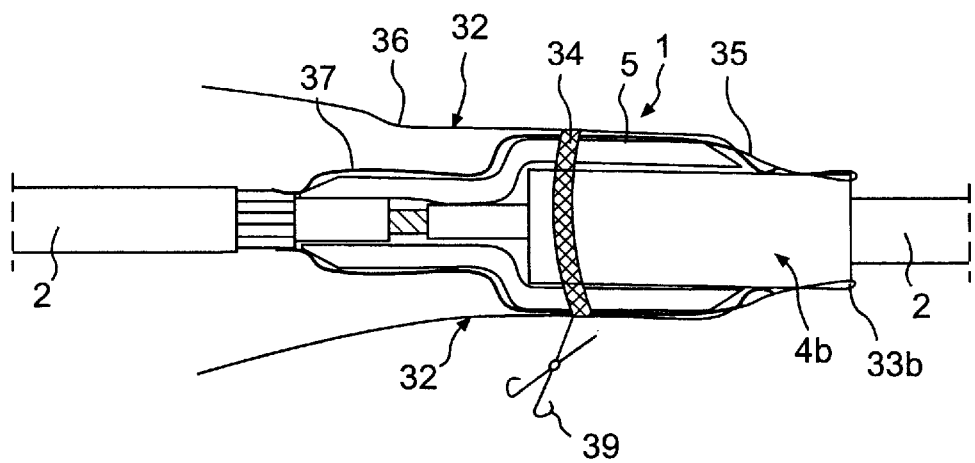
Figure 15F:
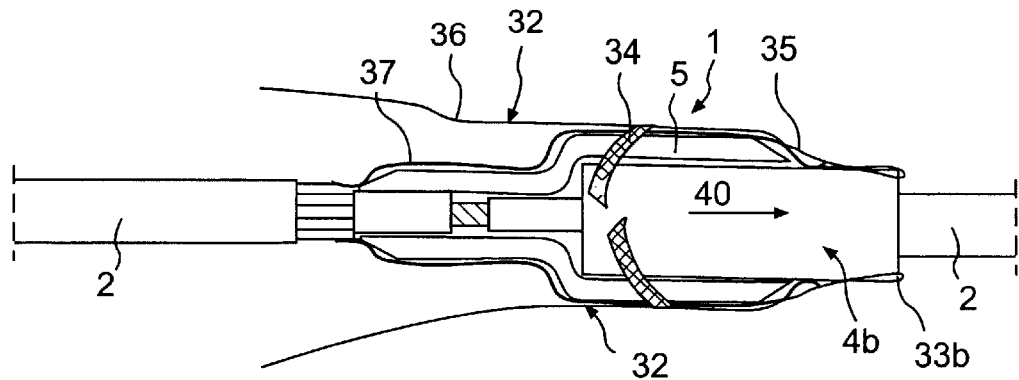
Figure 15G:
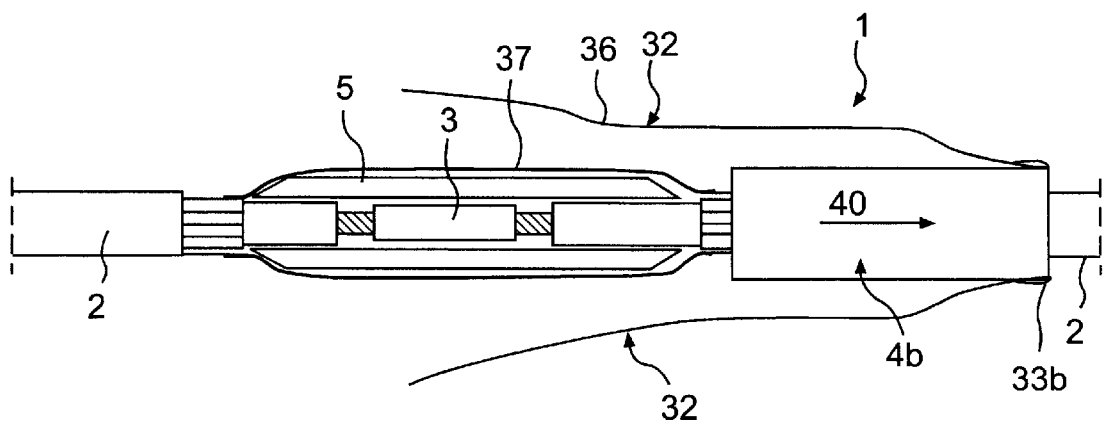

Next, the operator opens the clamping strap 34, for example by cutting it by means of scissors 39 illustrated diagrammatically in FIG. 15e. The second half-support 4b may then in turn be expelled due to the shrinkage of the sleeve 5, moving axially in the direction of the arrow 40 seen in the FIG. 15f until it is in the position illustrated in FIG. 15g, where it may be removed from the cable 2, as indicated previously for the half-support 4a.

Figure 15H:
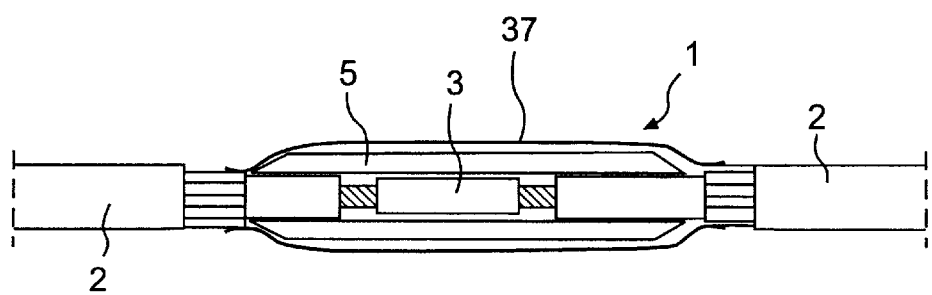

FIG. 15h diagrammatically illustrates the device according to the invention after complete removal of the two half-supports. It may be seen that the joint is completely protected by the shrunk sleeve 5.

FIG. 16 illustrates an alternative form of the embodiment shown in FIG. 15. In the embodiment illustrated in FIG. 16, there are again two longitudinal straps 32 connecting together the regions adjacent to the external edges of the two half-supports 4a, 4b. However, in this embodiment, the clamping strap 34 is replaced by two return straps 44 connecting the region of the external edge of the half-support 4b to a central region of the shrinkable sleeve 5. When employing this embodiment, in the manner as indicated previously in FIGS. 15a to 15h, the half-support 4b is temporarily immobilized by the presence of the two return straps 44 which act in a similar way to the clamping strap 34.

In the embodiment illustrated in FIG. 17, the same effect as in the embodiments illustrated in FIGS. 15 and 16 is obtained, using two longitudinal straps 32 arranged in a similar manner as in the previous embodiments, i.e. connecting together the regions of the external edges of the half-supports 4a, 4b. In the embodiment illustrated in FIG. 17, a locking ring 41a, 41b surrounds each half-support 4a, 4b near the external portion of the shrinkable sleeve 5. Each of the rings 41a, 41b has, as may be seen in FIG. 18, a plurality of axial grooves 42, the bore of each rings 41a, 41b being in contact with the exterior surface of the corresponding half-supports 4a, 4b, and said grooves 42 defining between them, housings 43 for the grease. The exterior surface of each of the rings 41a, 41b is dry, i.e. free of lubricant. The locking rings 41a, 41b therefore prevent the corresponding half-support 4a, 4b from sliding with respect to the sleeve 5 and thus fulfil the same role as the clamping strap 34 in the embodiment illustrated in FIG. 15 or the return straps 40 in the embodiment illustrated in FIG. 16.

What is claimed is:

1. A power cable joint device, comprising:
   at least one tubular rigid support element;
   a cold-shrinkable, pre-expanded sleeve; and
   a releasable means for immobilizing the at least one support element with respect to the pre-expanded sleeve,
   wherein most of an exterior surface of the at least one support element is lubricated by a grease that does not flow under action of a pressure exerted by the pre-expanded sleeve,
   wherein the pre-expanded sleeve grips the at least one support element over most of a length of the at least one support element,
   wherein the pre-expanded sleeve grips the at least one support element at internal ends of the at least one support element, and
   wherein the grease is based on a silicone or on a polyalkylene glycol and comprises:
      a filler in proportions ranging from 15%-by-weight to 45%-by-weight, or
      a pressure-withstanding additive in proportions ranging from 2%-by-weight to 10%-by-weight, or
      a filler in proportions ranging from 15%-by-weight to 45%-by-weight and a pressure-withstanding additive in proportions ranging from 2%-by-weight to 10%-by-weight.

2. The joint device of claim 1, wherein the filler comprises talc in proportions ranging from 15%-by-weight to 35%-by-weight.

3. The joint device of claim 2, wherein the filler further comprises up to 10%-by-weight of pyrogenated silica.

4. The joint device of claim 1, 2, or 3, wherein the pressure-withstanding additive comprises boron nitride.

5. The joint device of claim 1, wherein the releasable means creates a localized friction zone between the at least one support element and the pre-expanded sleeve,
   wherein, when released, the releasable means causes localized shrinkage of the pre-expanded sleeve near the internal ends of the at least one support element, and
   wherein the internal ends of the at least one support element are then thrust axially outwards.

6. The joint device of claim 1, wherein the at least one support element comprises two tubular rigid half-supports arranged at least partly inside the pre-expanded sleeve, wherein internal ends of the half-supports face each other.

7. The joint device of claim 6, wherein dimensions of the half-supports are the same.

8. The joint device of claim 6, wherein dimensions of the half-supports are different.

9. The joint device of claim 6, wherein a shape of the half-supports is cylindrical with a circular cross-section or cylindrical with an elliptical cross-section.

10. The joint device of claim 6, wherein at least one part of each half-support includes a taper with a circular or elliptical cross-section, and
    wherein the taper is oriented so that a diameter of each half-support is smaller toward an interior of the joint device.

11. The joint device of claim 6, wherein the releasable means comprises a means for temporarily fastening the half-supports together.

12. The joint device of claim 11, wherein the means for temporarily fastening the half-supports together comprises an internal strap, and
    wherein ends of the internal strap emerge from the joint device via holes provided in the half-supports.

13. The joint device of claim 11, wherein the means for temporarily fastening the half-supports together comprises:
    at least one tab projecting from the internal end of a first half-support; and
    at least one recess, of a shape corresponding to the at least one tab, in the internal end of a second half-support;

wherein the at least one tab is inclined with respect to an axis of the first half-support so that a relative rotation of the first half-support with respect to the second half-support causes the half-supports to separate.

14. The joint device of claim 11, wherein the means for temporarily fastening the half-supports together is formed by a frangible fastening of the internal ends of the half-supports.

15. The joint device of claim 6, wherein at least one of the half-supports includes, near the internal end of the half-support, a portion that may be torn by pulling on a tie extending from the joint device, and
wherein an exterior surface of the portion that may be torn is free of grease.

16. The joint device of claim 6, wherein each half-support comprises an annular friction element in contact with the pre-expanded sleeve, and wherein each half-support may be expelled from the pre-expanded sleeve by pulling on a tie extending from the joint device.

17. The joint device of claim 6, further comprising an additional means for immobilizing a first half-support with respect to the pre-expanded sleeve, wherein an effect of the additional means may be obviated after expelling the second half-support from the pre-expanded sleeve and checking that the joint device is centered on a power cable joint.

18. The joint device of claim 17, comprising:
at least one longitudinal external strap connected to external ends of the half-supports; and
a removable means for fixing the at least one external strap to the pre-expanded sleeve and for defining portions of unequal length on the at least one external strap.

19. The joint device of claim 17, further comprising:
at least one longitudinal external strap connected to external ends of the half-supports; and
at least one return strap fixed on a first side to the external end of a first half-support and on a second side to an exterior surface of the pre-expanded sleeve near a center of the joint device.

20. The joint device of claim 17, comprising:
at least one longitudinal external strap linking external ends of the half-supports together; and
a removable localized-friction means placed on each half-support in direct contact with the pre-expanded sleeve.

21. The joint device of claim 1, wherein the at least one support element comprises means for separating the at least one support element from a power cable after the at least one support element has been expelled from the pre-expanded sleeve.

22. The joint device of claim 21, wherein the at least one support element is prescored along a helical incision.

23. The joint device of claim 21, wherein the at least one support element may be cut into two parts along a generatrix.

24. The joint device of claim 23, wherein the at least one support element comprises one or more frangible rupture zones along the generatrix.

* * * * *